(12) United States Patent
Lee et al.

(10) Patent No.: US 11,114,724 B2
(45) Date of Patent: Sep. 7, 2021

(54) BATTERY MODULE, AND BATTERY PACK AND ENERGY STORAGE SYSTEM INCLUDING THE SAME

(71) Applicant: LG CHEM, LTD., Seoul (KR)

(72) Inventors: Bum-Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 191 days.

(21) Appl. No.: 16/337,814

(22) PCT Filed: Jul. 5, 2018

(86) PCT No.: PCT/KR2018/007644
§ 371 (c)(1),
(2) Date: Mar. 28, 2019

(87) PCT Pub. No.: WO2019/027149
PCT Pub. Date: Feb. 7, 2019

(65) Prior Publication Data
US 2019/0229313 A1 Jul. 25, 2019

(30) Foreign Application Priority Data
Jul. 31, 2017 (KR) .......................... 10-2017-0096808

(51) Int. Cl.
*H01M 2/10* (2006.01)
*H01M 50/20* (2021.01)
(Continued)

(52) U.S. Cl.
CPC ......... *H01M 50/20* (2021.01); *H01M 10/613* (2015.04); *H01M 10/627* (2015.04);
(Continued)

(58) Field of Classification Search
CPC ............. H01M 2/1077; H01M 2/1061; H01M 10/655; H01M 2220/30; H01M 2220/20;
(Continued)

(56) References Cited

U.S. PATENT DOCUMENTS 9,331,367 B2   5/2016  Shin et al.
2006/0063067 A1  3/2006  Kim
(Continued)

FOREIGN PATENT DOCUMENTS

CN   104025370 A   9/2014
CN   10482040 A    5/2015
(Continued)

OTHER PUBLICATIONS

Machine English language translation of Ryu Jae Yeon et al. (KR20130076502(A); (Year: 2013).*
(Continued)

*Primary Examiner* — Jonathan G Jelsma
*Assistant Examiner* — Omar M Kekia
(74) *Attorney, Agent, or Firm* — Birch, Stewart, Kolasch & Birch LLP (57) ABSTRACT

A battery module having a plurality of battery cells and a module case configured to accommodate the plurality of battery cells is provided. The module case includes first and second cases coupled to each other by hooking and having shapes corresponding to each other.

10 Claims, 10 Drawing Sheets

(51) Int. Cl.
*H01M 10/627* (2014.01)
*H01M 10/613* (2014.01)
*H01M 10/655* (2014.01)
*H01M 50/209* (2021.01)
*H01M 10/6551* (2014.01)

(52) U.S. Cl.
CPC ....... *H01M 10/655* (2015.04); *H01M 50/209* (2021.01); *H01M 10/6551* (2015.04); *H01M 2220/20* (2013.01); *H01M 2220/30* (2013.01); *Y02E 60/10* (2013.01)

(58) Field of Classification Search
CPC .. H01M 10/613; H01M 10/6551; H01M 2/10; H01M 10/627; H01M 50/20; H01M 50/209; Y02E 60/10
USPC .......................................................... 429/99
See application file for complete search history.

(56) References Cited

U.S. PATENT DOCUMENTS

| | | |
|---|---|---|
| 2007/0281208 A1 | 12/2007 | Yoon et al. |
| 2008/0292913 A1 | 11/2008 | Hong et al. |
| 2011/0135994 A1 | 6/2011 | Yang et al. |
| 2012/0070718 A1* | 3/2012 | Motohashi .......... H01M 2/1077 429/156 |
| 2012/0214025 A1 | 8/2012 | Moon et al. |
| 2012/0231302 A1 | 9/2012 | Ahn |
| 2014/0023894 A1 | 1/2014 | Jansen et al. |
| 2014/0234691 A1 | 8/2014 | Lee et al. |
| 2015/0072206 A1* | 3/2015 | Houchin-Miller .... B60L 3/0046 429/120 |
| 2015/0372260 A1 | 12/2015 | Sora |
| 2016/0036017 A1 | 2/2016 | Seong et al. |
| 2016/0093847 A1 | 3/2016 | Gunther et al. |
| 2017/0309980 A1 | 10/2017 | Hong et al. |
| 2018/0062196 A1 | 3/2018 | Eom et al. |

FOREIGN PATENT DOCUMENTS

| | | | | |
|---|---|---|---|---|
| EP | 1641058 A1 | 3/2006 | | |
| JP | 2008-165989 A | 7/2008 | | |
| JP | 2009-529217 A | 8/2009 | | |
| KR | 10-2006-0084887 A | 7/2006 | | |
| KR | 10-0649561 B1 | 11/2006 | | |
| KR | 10-2008-0102605 A | 11/2008 | | |
| KR | 10-2012-0101874 A | 9/2012 | | |
| KR | 10-1234242 B1 | 2/2013 | | |
| KR | 10-1264432 B1 | 5/2013 | | |
| KR | 20130076502 A | * | 7/2013 | ............. Y02E 60/10 |
| KR | 10-2015-0047030 A | 5/2015 | | |
| KR | 10-2016-0040799 A | 4/2016 | | |
| KR | 10-2016-0077451 A | 7/2016 | | |
| KR | 10-1652653 B1 | 8/2016 | | |
| KR | 10-2016-0108960 A | 9/2016 | | |
| WO | WO 2017-052104 A1 | 3/2017 | | |

OTHER PUBLICATIONS

International Search Report issued in PCT/KR2018/007644 (PCT/ISA/210), dated Oct. 23, 2018.

\* cited by examiner

BATTERY MODULE, AND BATTERY PACK AND ENERGY STORAGE SYSTEM INCLUDING THE SAME

TECHNICAL FIELD

The present disclosure relates to a battery module, and a battery pack and an energy storage system including the battery module.

The present application claims priority to Korean Patent Application No. 10-2017-0096808 filed on Jul. 31, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

In the conventional battery module or battery pack, it is most important to dissipate heat generated at the battery cells because of the risk of fire or explosion due to the heating or the like of the battery cells.

Moreover, since the battery cells disposed inside the battery module or the battery pack may be exploded or ignited due to an external impact, it is necessary to fix the battery cells more stably inside the module case.

In addition, in case of the battery module or the battery pack, it is advantageous to have a more compact structure in terms of energy density, and it is also desirable to have a simpler and more compact structure in terms of process efficiency.

DISCLOSURE

Technical Problem

The present disclosure is directed to providing a battery module, which may more efficiently dissipate heat generated at battery cells, and a battery pack and an energy storage system including the battery module.

In addition, the present disclosure is directed to providing a battery module, which may more stably fix the battery cells inside a battery case, and a battery pack and an energy storage system including the battery module.

Also, the present disclosure is directed to providing a battery module, which has a more compact structure with high energy density and process efficiency, and a battery pack and an energy storage system including the battery module.

Technical Solution

In one aspect of the present disclosure, there is provided a battery module, comprising: a plurality of battery cells; and a module case configured to accommodate the plurality of battery cells, wherein the module case includes first and second cases coupled to each other by hooking and having shapes corresponding to each other.

Each of the first and second cases may include: a horizontal portion having a predetermined area; and a vertical portion perpendicularly bent from the horizontal portion.

The horizontal portion of the first case may be coupled to the vertical portion of the second case by hooking, and the vertical portion of the first case may be coupled to the horizontal portion of the second case by hooking.

Each of the first and second cases may include at least one forming portion.

Each of the at least one forming portion may include: a first forming groove engaged with an edge portion of a corresponding battery cell of the battery cells and formed along a longitudinal direction of the respective first and second cases; and a second forming groove formed at opposite ends of the first forming groove to have a step with respect to the first forming groove and configured to limit the movement of the corresponding battery cell.

The first forming groove may be provided in plural, and the first forming grooves may be spaced apart from each other along a stacking direction of the battery cells.

The second forming groove may be provided in plural, and the second forming grooves may be formed at opposite ends of each of the first forming grooves.

In addition, the present disclosure provides a battery pack comprising a plurality of battery modules according to the former embodiments, wherein the module case of each of the plurality of battery modules has at least one bead arranged such that facing module cases of the plurality of battery modules form a zigzag pattern.

Moreover, the present disclosure provides an energy storage system comprising at least one battery pack according to the former embodiments.

Advantageous Effects

According to various embodiments as above, it is possible to provide a battery module, which may more efficiently dissipate heat generated at battery cells, and a battery pack and an energy storage system including the battery module.

In addition, according to various embodiments as above, it is possible to provide a battery module, which may more stably fix the battery cells inside a battery case, and a battery pack and an energy storage system including the battery module.

Also, according to various embodiments as above, it is possible to provide a battery module, which has a more compact structure with high energy density and process efficiency, and a battery pack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
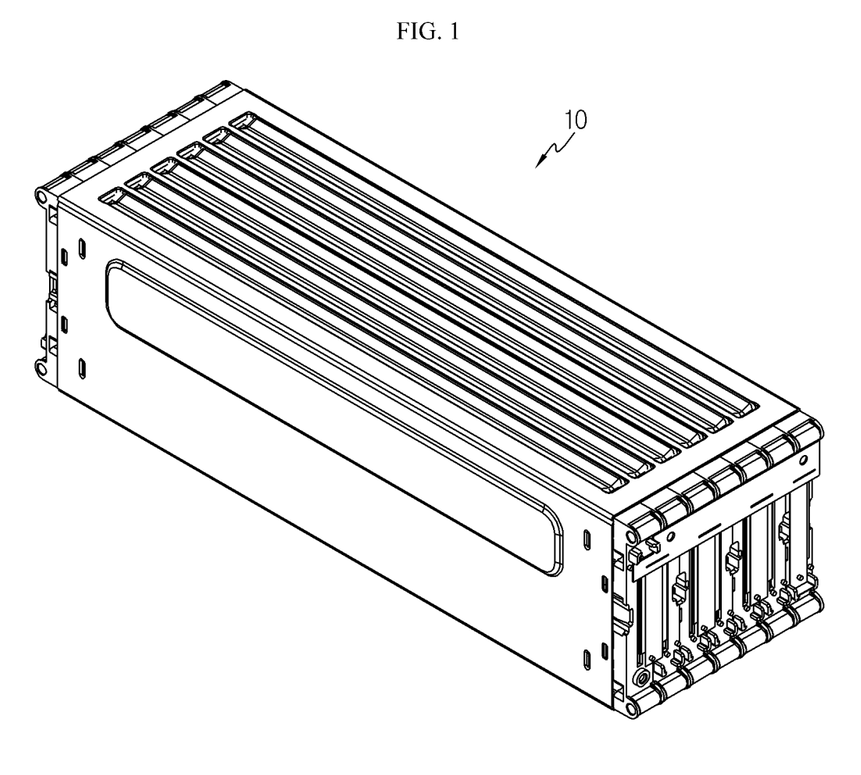
FIG. 1 is a diagram for illustrating a battery module according to an embodiment of the present disclosure.
Figure 2:
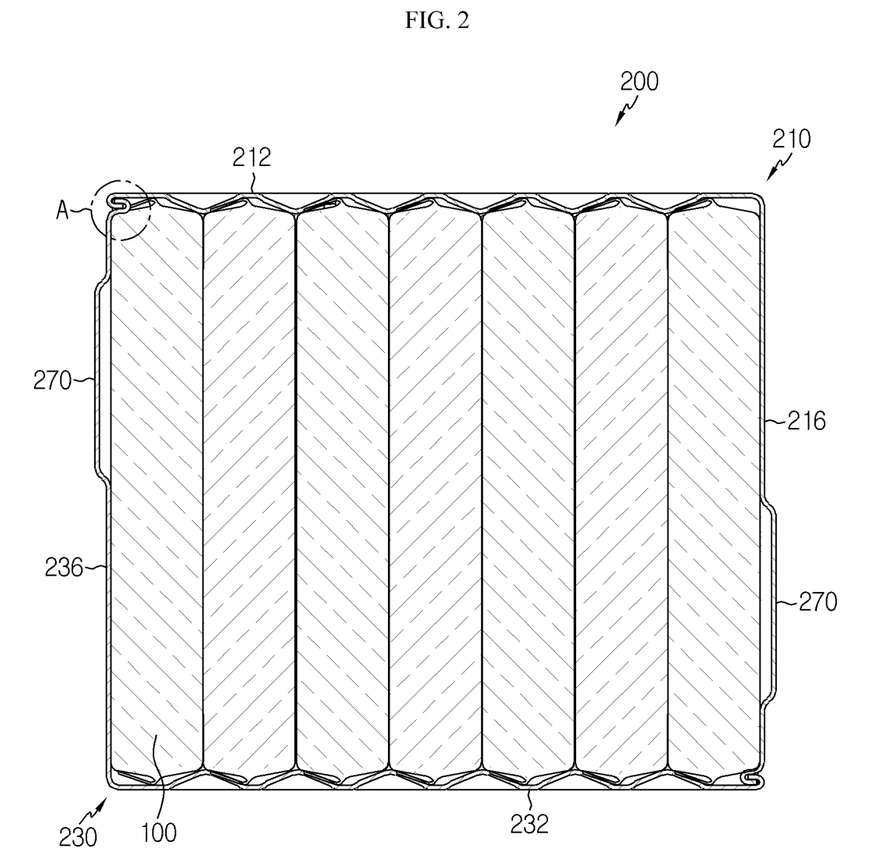
FIG. 2 is a cross-sectioned view showing the battery module of FIG. 1.
Figure 3:
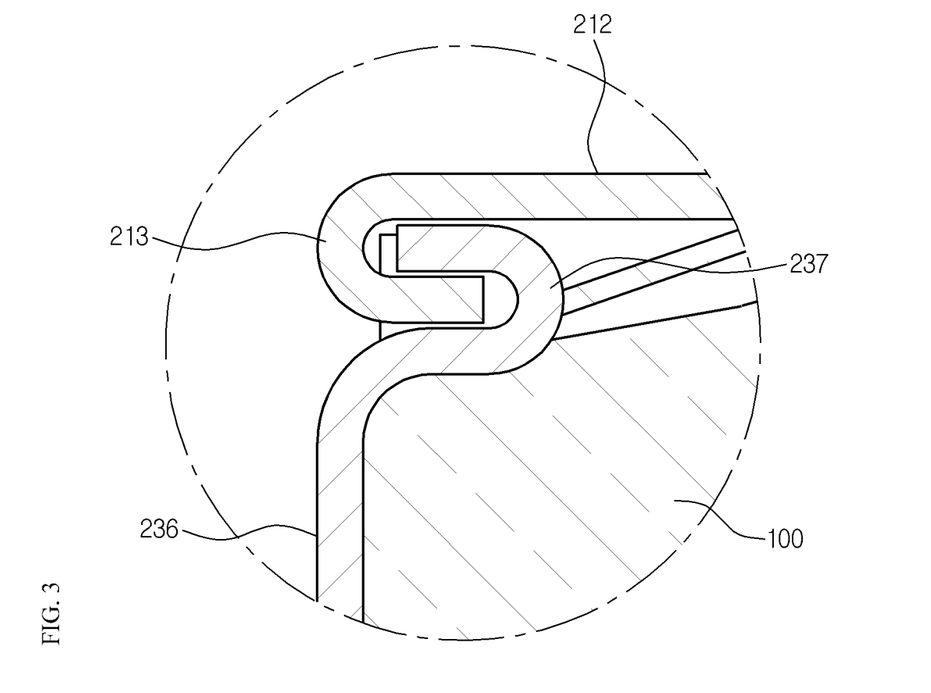
FIG. 3 is an enlarged view showing a portion A of the battery module of FIG. 2.
Figure 4:
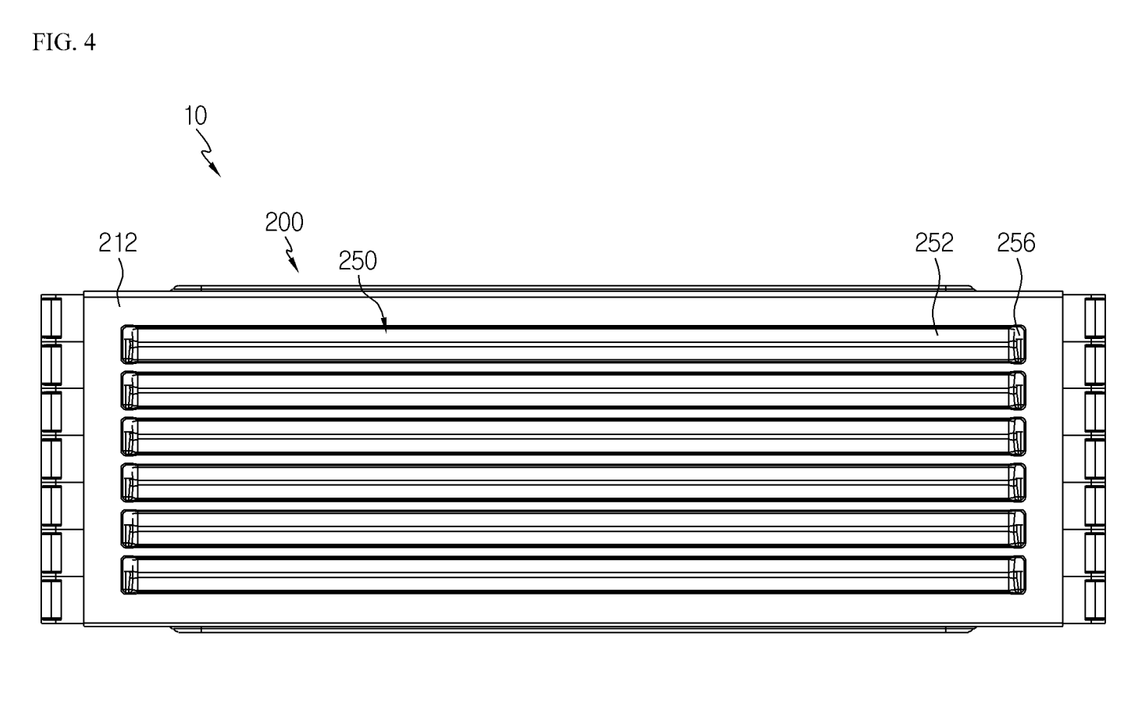
FIG. 4 is a plane view showing the battery module of FIG. 1.
Figure 5:
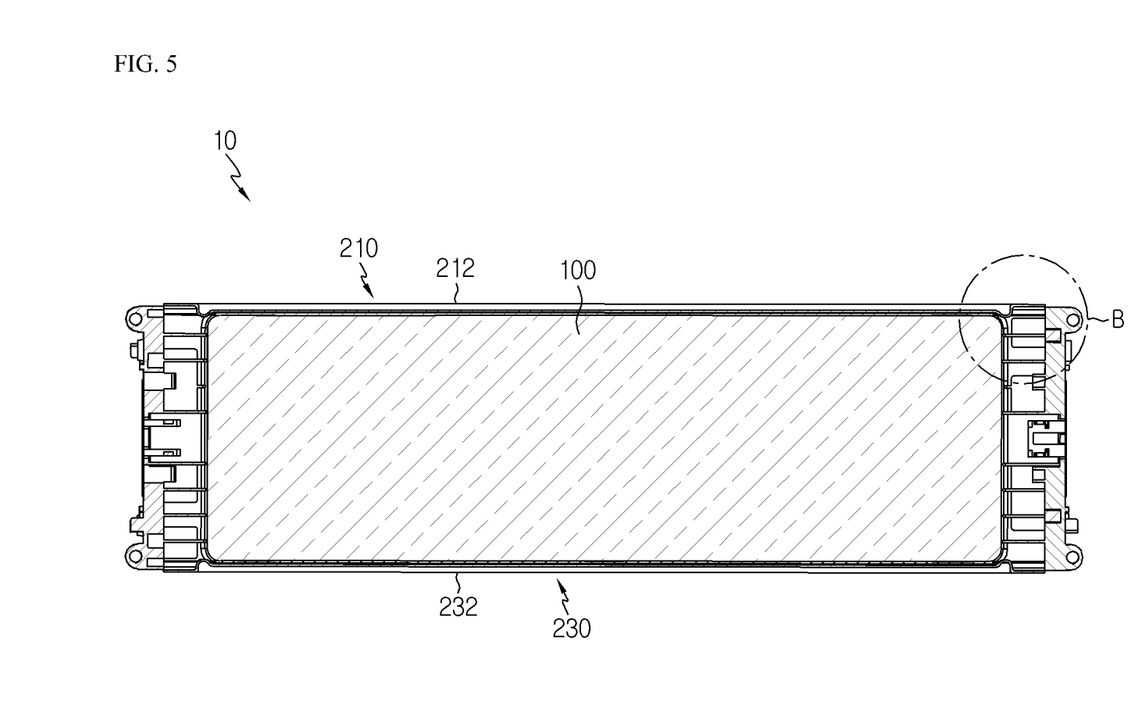
FIG. 5 is a cross-sectioned view showing the battery module of FIG. 4.
Figure 6:
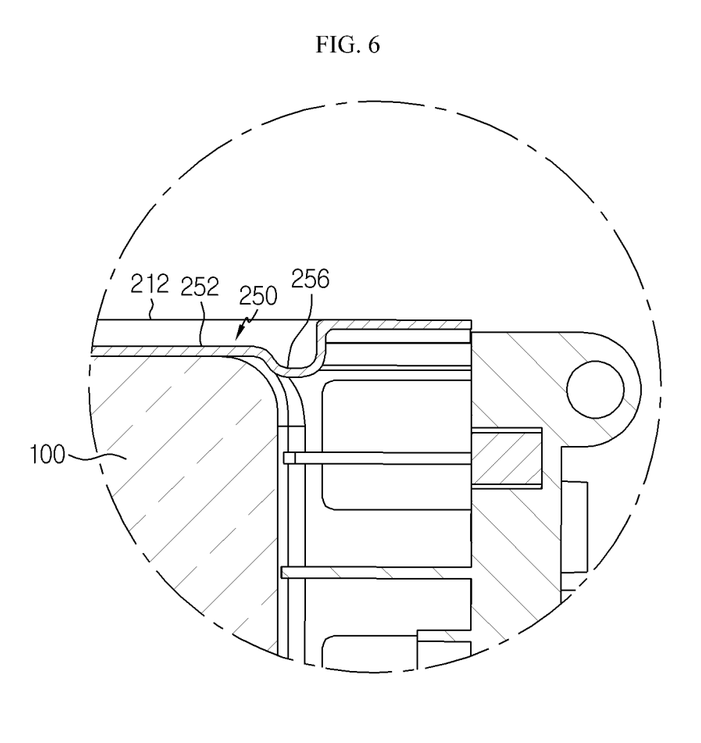
FIG. 6 is an enlarged view showing a portion B of the battery module of FIG. 5.

FIG. 1 is a diagram for illustrating a battery module according to an embodiment of the present disclosure, FIG. 2 is a cross-sectioned view showing the battery module of FIG. 1, FIG. 3 is an enlarged view showing a portion A of the battery module of FIG. 2, FIG. 4 is a plane view showing the battery module of FIG. 1, FIG. 5 is a cross-sectioned view showing the battery module of FIG. 4, and FIG. 6 is an enlarged view showing a portion B of the battery module of FIG. 5.

Referring to FIGS. 1 to 6, a battery module 10 may include a battery cell 100 and a module case 200.

The battery cell 100 may be a secondary battery, or a pouch-type secondary battery. The battery cell 100 may be provided in plural, and the plurality of battery cells 100 may be stacked to be electrically connected to each other.

The module case 200 is used for accommodating the plurality of battery cells 100 and may include a first case 210, a second case 230, a forming portion 250 and a bead 270.

The first case 210 may have a plate shape substantially with an L shape. The first case 210 may be coupled to the second case 230, explained later, by hooking to accommodate the plurality of battery cells 100.

The first case 210 may be made of a material with a high thermal conductivity to increase the heat dissipation efficiency. For example, the first case 210 may be made of aluminum.

The first case 210 may include a horizontal portion 212 and a vertical portion 216.

The horizontal portion 212 may have a substantially plate shape with a predetermined area. The vertical portion 216 may be bent perpendicularly from the horizontal portion 212. The first case 210 may form an L-shaped plate shape by means of the horizontal portion 212 and the vertical portion 216.

The second case 230 may have a shape corresponding to the first case 210 and may be coupled to the first case 210 by hooking to accommodate the battery cells 100.

The second case 230 may also include a horizontal portion 232 and a vertical portion 236.

The horizontal portion 232 may also have a substantially plate shape with a predetermined area, similar to the horizontal portion 212 of the first case 210. In addition, the vertical portion 236 may also be bent perpendicularly from the horizontal portion 232, similar to the vertical portion 216 of the first case 210. The second case 230 may also form an L-shaped plate shape by means of the horizontal portion 232 and the vertical portion 236, which corresponds to the first case 210.

The coupling by hooking will be described more specifically. The horizontal portion 212 of the first case 210 may be coupled to the vertical portion 236 of the second case 230 by hooking, and the vertical portion 216 of the first case 210 may be coupled to the horizontal portion 232 of the second case 230 by hooking.

For this hook-coupling, a hook may be provided at each end portion. For example, as shown in FIG. 3, a hook for the hook-coupling is formed at an end portion 213 of the horizontal portion 212 of the first case 210, and a hook that is hooked to the end portion 213 of the horizontal portion 212 may be formed at an end portion 237 of the vertical portion 236 of the second case 230.

In this embodiment, the first and second cases 210, 230 of the module case 200 may be coupled to each other just by the hooking, and thus the efficiency of the assembling process of the module case 200 may be improved.

The forming portion 250 is used for more stably supporting the battery cells 100 and may have a groove shape with a predetermined depth in the first and second cases 210, 230. The forming portion 250 may be formed in at least two stages and may be provided in plural.

The plurality of forming portions 250 are formed at the horizontal portions 212, 232 of the first and second cases 210, 230, respectively, and may be spaced apart from each other by a predetermined distance. The plurality of forming portions 250 may include a first forming groove 252 and a second forming groove 256, respectively.

The first forming groove 252 is engaged with an edge portion of the battery cells 100 and may be formed along a longitudinal direction of the first and second cases 210, 230. The first forming groove 252 is provided in a plural, and the plurality of first forming grooves 252 may be spaced apart from each other along a stacking direction of the battery cells 100.

Since the plurality of first forming grooves 252 are closely adhered to the edge portions of the battery cells 100 in the stacking direction of the battery cells 100, it is possible to more securely fix the battery cells 100 while effectively preventing the movement of the battery cells 100.

The plurality of first forming grooves 252 may be formed to have a shape corresponding to the edge portion of the battery cells 100. Thus, when the battery cells 100 are placed on the first and second cases 210, 230 of the module case 200, the battery cells 100 may be positioned at assembly positions more easily.

The second forming grooves 256 may be formed to have a step with respect to the first forming groove 252 at both ends of the first forming groove 252. The second forming groove 256 is provided in plural, and the plurality of second forming grooves 256 may be formed at both ends of the plurality of first forming grooves 252.

The plurality of second forming grooves 256 may serve as a stopper to limit the movement of the battery cells 100, which may occur at both lateral sides of the battery cells 100.

The bead 270 is used for further improving the heat dissipation efficiency of the module case 200 and may be formed at the vertical portions 216, 236 of the first and second cases 210, 230.

Meanwhile, when a plurality of battery modules 10 are assembled, the beads 270 may be formed to be disposed in a zigzag pattern with beads 270 of a facing module case 200. In this arrangement, when the plurality of battery modules 10 are connected, it is possible to prevent interference between the beads 270, and it is also possible to prevent an uneven compressive force from being applied to the battery cells 100 inside the module case 200.

Figure 7:
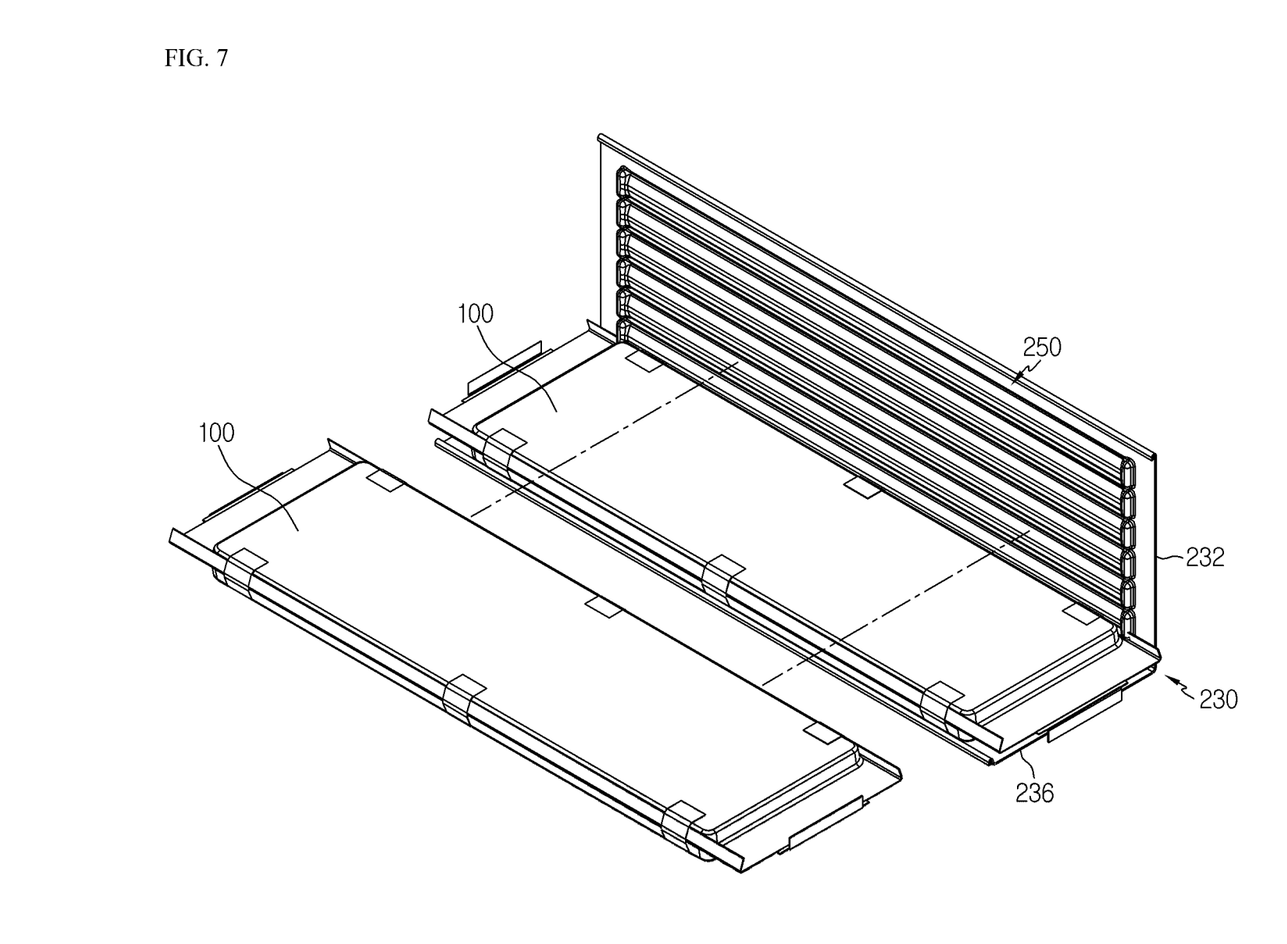
FIGS. 7 and 8 are diagrams for illustrating a process of assembling the battery module of FIG. 1.
Figure 8:
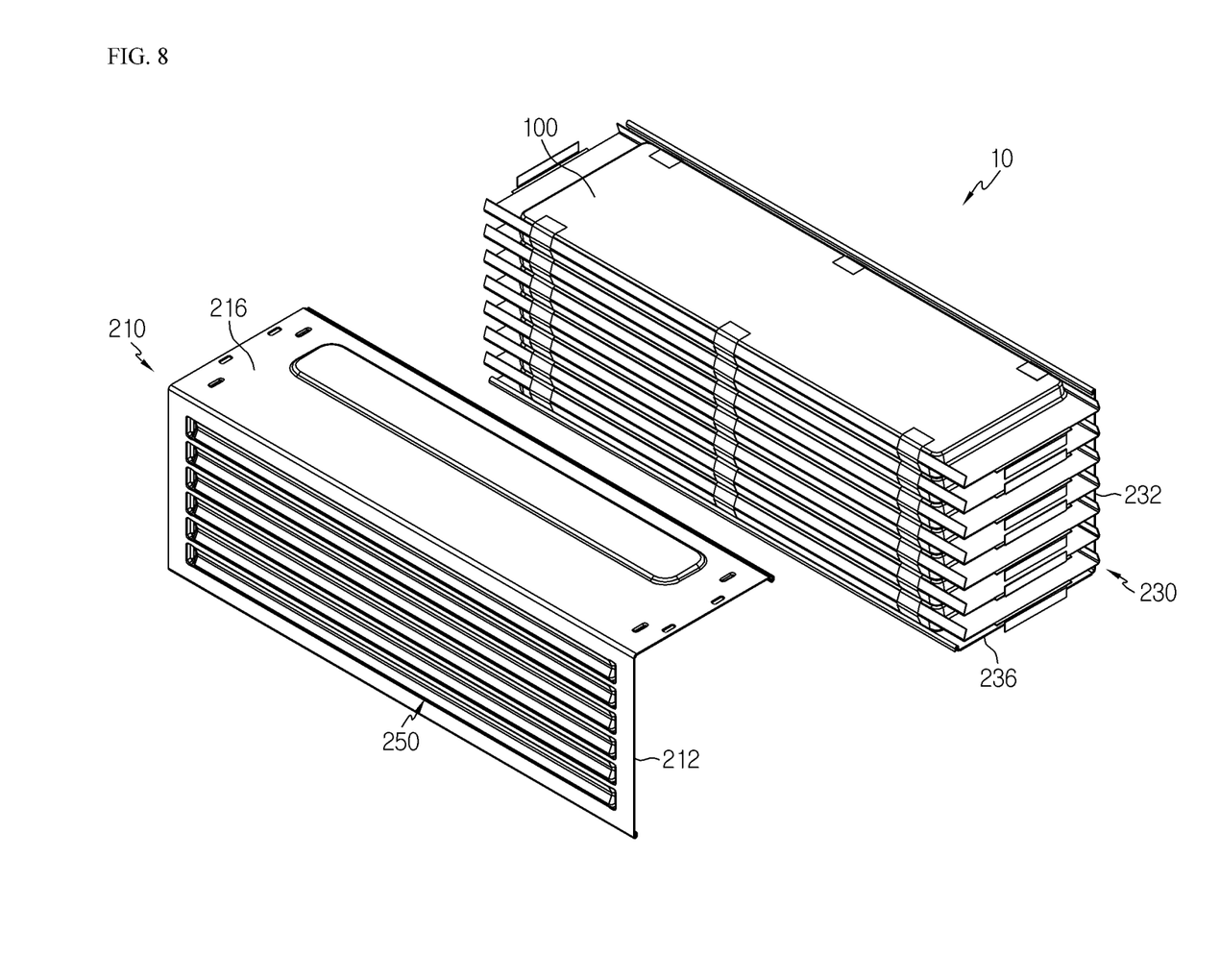

FIGS. 7 and 8 are diagrams for illustrating a process of assembling the battery module of FIG. 1.

Referring to FIGS. 7 and 8, when the battery cells 100 and the module case 200 are assembled, for example, the battery cells 100 may be closely adhered to and fixedly fitted into the forming portions 250 of the second case 230, respectively. If the battery cells 100 are completely mounted to the second case 230, the first case 210 may be coupled to the second case 230 by hooking, and at this time, the edge portion of the battery cells 100 may be closely fitted into the forming portions 250 of the first case 210.

Here, if the hook-coupling is completed, the battery cells 100 may be stably fixed inside the first case 210 and the second case 230. Accordingly, the battery module 10 of this embodiment may fix and accommodate the battery cells 100 with a simpler structure, and may realize a more compact structure that is advantageous in terms of slimming and energy density.

Moreover, since the forming portions 250 of the first and second cases 210, 230 are disposed closely to the edge portion of the battery cells 100, when the battery cells 100 generate heat, the heat may be transmitted to the module case 200 more quickly. Accordingly, the battery module 10 of this embodiment may effectively dissipate the heat generated at the battery cells 100.

Figure 9:
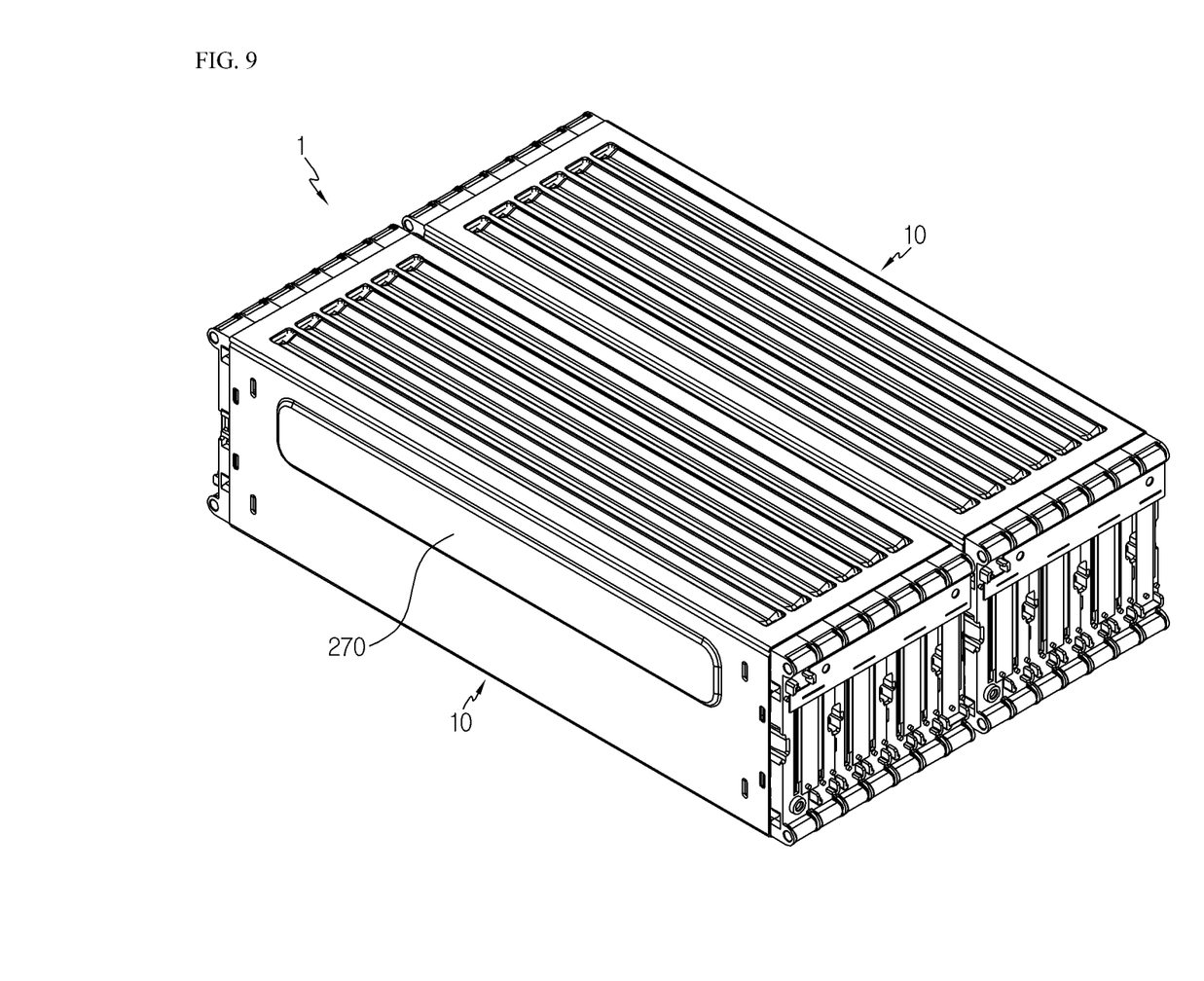
FIGS. 9 and 10 are diagrams for illustrating a battery pack according to an embodiment of the present disclosure.
Figure 10:
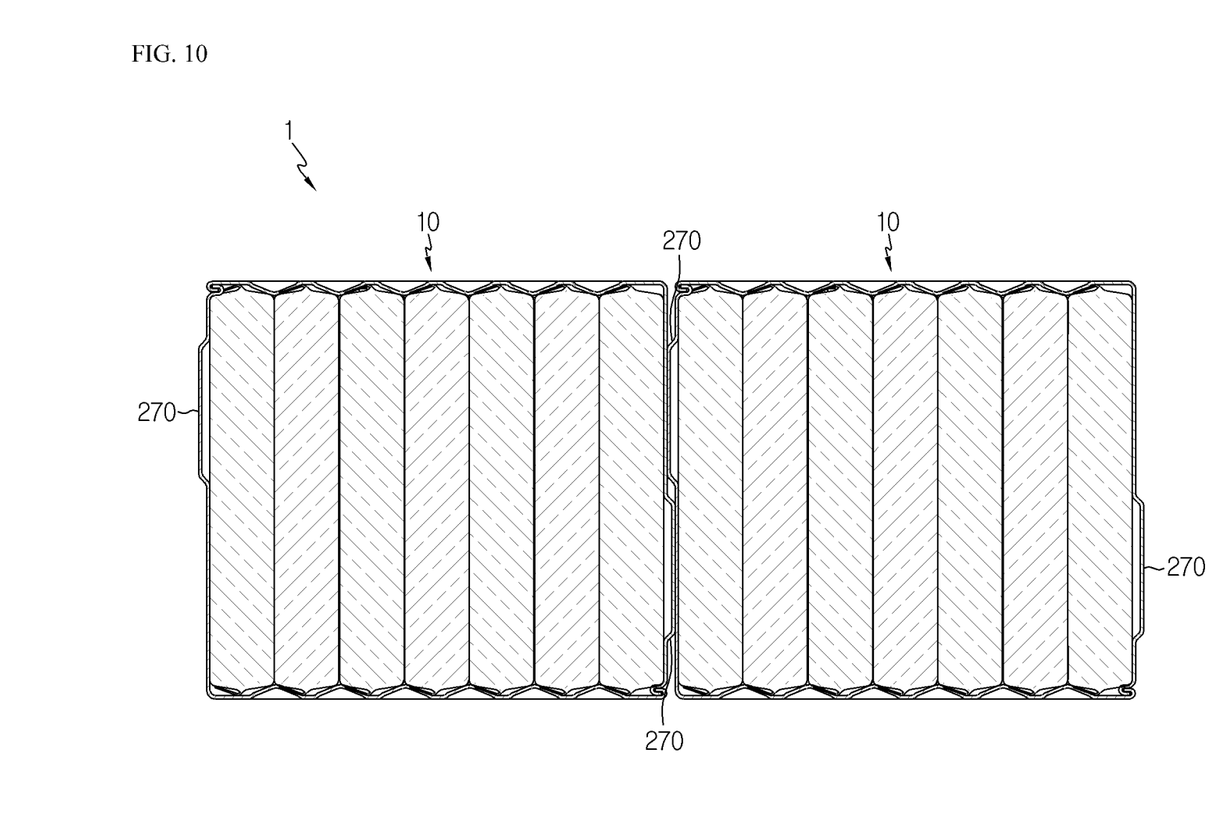

FIGS. 9 and 10 are diagrams for illustrating a battery pack according to an embodiment of the present disclosure.

Referring to FIGS. 9 and 10, a battery pack 1 may be provided at an energy storage system that is used for vehicles such as an electric vehicle or a hybrid vehicle, and also for household or industrial purposes. The battery pack 1 may be provided as an assembly of a plurality of battery modules 10. Here, since the beads 270 of the module cases 200 of the facing battery modules 10 are mutually arranged in a zigzag pattern, the beads 270 may not cause interference to each other when in they are stacked.

Here, the beads 270 of the facing battery modules 10 arranged in a zigzag pattern, namely the beads 270 arranged side by side vertically as in this embodiment, do not cause an uneven compression toward the battery cells without mutual interference.

According to various embodiments as above, it is possible to provide a battery module 10, which may more efficiently dissipate heat generated at battery cells 100, and a battery pack 1 and an energy storage system including the battery module.

In addition, according to various embodiments as above, it is possible to provide a battery module 10, which may more stably fix the battery cells 100 inside the battery case 200, and a battery pack 1 and an energy storage system including the battery module.

Also, according to various embodiments as above, it is possible to provide a battery module 10, which has a more compact structure with high energy density and process efficiency, and a battery pack 1 and an energy storage system including the battery module.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells, each battery cell having a top surface, a bottom surface opposite the top surface, a first end surface and a second end surface opposite the first end surface, the plurality of battery cells stacked in a first direction;
   a module case configured to accommodate the plurality of battery cells; and
   at least one forming portion, the at least one forming portion comprising:
      a first forming groove extending in a second direction and having a first end and a second end spaced from each other in the second direction, the first forming groove engaged with the top surface of a corresponding battery cell of the plurality of battery cells; and
      a second forming groove formed at each of the first end and the second end of the first forming groove, the second grooves respectively contacting the first end surface and the second end surface of a corresponding battery cell,
   wherein the module case includes first and second cases coupled to each other by hooking and having shapes corresponding to each other.

2. The battery module according to claim 1, wherein each of the first and second cases includes:
   a horizontal portion having a predetermined area; and
   a vertical portion perpendicularly bent from the horizontal portion.

3. The battery module according to claim 2, wherein the horizontal portion of the first case is coupled to the vertical portion of the second case by hooking, and
   wherein the vertical portion of the first case is coupled to the horizontal portion of the second case by hooking.

4. The battery module according to claim 1, wherein the first forming groove is provided in plural, and
   wherein the first forming grooves are spaced apart from each other in the first direction.

5. The battery module according to claim 4, wherein each of the first forming grooves contacts the top surface of a corresponding battery cell of the plurality of battery cells.

6. A battery pack, comprising:
   a plurality of battery modules as defined in claim 1, wherein the module case of each of the plurality of battery modules has at least one bead arranged such that facing modules cases of the plurality of battery modules form a zigzag pattern.

7. An energy storage system, comprising:
at least one battery pack as defined in claim 6.

8. The battery module according to claim 1, wherein the at least one forming portion is a plurality of forming portions, and
wherein a number of the plurality of forming portions equals a number of the plurality of battery cells.

9. The battery module according to claim 1, wherein the first forming groove is a depression in the module case.

10. The battery module according to claim 9, wherein the second forming groove is a depression in the module case, a depth of the second forming groove being greater than a depth of the first forming groove.

* * * * *